(12) United States Patent
Niessink

(10) Patent No.: US 8,547,636 B1
(45) Date of Patent: Oct. 1, 2013

(54) TUNABLE MAGNET STRUCTURE

(75) Inventor: James Frederick Niessink, Suttons Bay, MI (US)

(73) Assignee: Electro-Optics Technology, Inc., Traverse City, MI (US)

( * ) Notice: Subject to any disclaimer, the term of this patent is extended or adjusted under 35 U.S.C. 154(b) by 278 days.

(21) Appl. No.: 12/938,567

(22) Filed: Nov. 3, 2010

(51) Int. Cl.
*G02B 27/02* (2006.01)

(52) U.S. Cl.
USPC .................................... 359/484.02

(58) Field of Classification Search
USPC .... 359/298, 200.7, 237, 324, 484.01–484.09; 372/102, 26, 27, 37, 703, 105; 385/16, 6, 385/57; 335/209–220
See application file for complete search history.

(56) References Cited

U.S. PATENT DOCUMENTS

| | | | | |
|---|---|---|---|---|
| 4,703,276 A | * | 10/1987 | Beer | 324/319 |
| 5,469,455 A | * | 11/1995 | Reitz et al. | 372/20 |
| 5,528,415 A | * | 6/1996 | Gauthier et al. | 359/282 |
| 5,715,080 A | * | 2/1998 | Scerbak | 359/281 |
| 6,088,153 A | * | 7/2000 | Anthon et al. | 359/341.32 |
| 6,212,209 B1 | * | 4/2001 | Delavaux | 372/10 |
| 6,950,235 B2 | * | 9/2005 | Sabia et al. | 359/484.03 |
| 7,308,171 B2 | * | 12/2007 | Booth et al. | 385/34 |
| 2005/0117218 A1 | * | 6/2005 | Xiang et al. | 359/484 |

FOREIGN PATENT DOCUMENTS

JP 59-165020 A 9/1984

OTHER PUBLICATIONS

Gauthier et al., "*Simple, Compact, High-Performance Permanent-Magnet Faraday Isolator*", pp. 623-625, vol. 11, No. 10/ Optics Letters, Oct. 1986.
Halbach, "*Physical and Optical Properties of Rare Earth Cobalt Magnets*", Nuclear Instruments and Methods 187, pp. 109-117, (1981).

* cited by examiner

*Primary Examiner* — Alessandro Amari
*Assistant Examiner* — Jie Lei
(74) *Attorney, Agent, or Firm* — Kilpatrick Townsend & Stockton LLP; Kenneth R. Allen

(57) ABSTRACT

An axially symmetric permanent magnet structure with tunable longitudinal fields is described wherein selected radial magnet sectors in a truncated Halbach array configuration are tiltable. The tunable magnet structure is particularly useful in Faraday devices, such as Faraday rotators, Faraday mirrors, optical circulators and optical isolators.

10 Claims, 5 Drawing Sheets

TUNABLE MAGNET STRUCTURE

CROSS-REFERENCES TO RELATED APPLICATIONS

Not Applicable

STATEMENT AS TO RIGHTS TO INVENTIONS MADE UNDER FEDERALLY SPONSORED RESEARCH OR DEVELOPMENT

Not Applicable

REFERENCE TO A "SEQUENCE LISTING," A TABLE, OR A COMPUTER PROGRAM LISTING APPENDIX SUBMITTED ON A COMPACT DISK

Not Applicable

BACKGROUND OF THE INVENTION

This invention relates to structures for generating controllable magnetic fields. Among other things, the invention has application to control systems for nonlinear optical devices. More particularly, this invention relates to an axially symmetric permanent magnet structure capable of generating tunable magnetic fields directed along the axis of the magnet structure. The invention can be used to precisely tune the strength of longitudinal fields within the central region of the axially symmetric structure.

Strong alternating polarity axial magnetic fields using an array of low volume permanent magnets were first used in the 1980's by Klaus Halbach to focus accelerator particle beams. The arrays had the additional feature of very low external fields along the outer surfaces of the array. Truncated forms of these "Halbach arrays" can generate high unidirectional longitudinal fields in excess 10,000 Oersted within the center of axially symmetric magnet structures using low-cost neodymium iron boron permanent magnets. Such magnet structures have been widely used in Faraday rotators.

Faraday rotators are used to achieve non-reciprocal polarization rotation in optical systems. They are also widely used in "Faraday-effect" devices such as optical isolators, optical circulators, and Faraday mirrors in either polarization maintaining [PM] or polarization independent or polarization insensitive [PI] forms, as appropriate, in many laser systems. Optical isolators are used to block external reflections and/or noise emission from amplifiers that may cause instability or damage if permitted to re-enter a laser source. Proper operation of these Faraday-effect devices typically requires precisely 45° of non-reciprocal polarization ("Faraday") rotation at a specific wavelength and/or temperature. The amount of Faraday rotation is given by:

$$\theta(\lambda,T) = V(\lambda,T) \times H(T) \times L \qquad (1).$$

where:
- $\theta(\lambda,T)$: The Faraday rotation angle (a function of wavelength, $\lambda$; temperature, $T$);
- $V(\lambda,T)$: A proportionality constant, termed the Verdet constant, of the optical element (a function of wavelength, $\lambda$, and temperature, $T$);
- $H(T)$: The strength of the magnetic field in the direction of light through the optical element (a function of temperature, $T$); and
- $L$: The length of the optical element.

The high values for $H(T)$ achieved with truncated Halbach arrays minimize the length $L$ of the Faraday rotator optical element required. This is preferable because undesirable thermal lensing and thermal birefringence at high average optical power due to absorption in the Faraday optical element increases with increasing length L.

The Verdet constant $V(\lambda,T)$ is a function of both wavelength and temperature, and the magnetic field $H(T)$ is a function of temperature. It follows for a fixed optical element length L that the product $H(T) \times L$ will typically need to be adjusted in order to achieve the desired 45° Faraday rotation angle $\theta(\lambda,T)$ at an arbitrary temperature and/or wavelength.

When the magnetic field $H(T)$ varies in strength along the axis of light propagation (as in a truncated Halbach array), it is possible in some contexts to physically translate the Faraday optic element relative to the magnet structure in order to vary the product $H(T) \times L$ and thereby precisely adjust the rotation angle $\theta(\lambda,T)$. However, optical isolators and circulators can be extremely sensitive to any change in orientation or position of optical elements—particularly when both the input and output are fiber coupled. For such devices mechanical stability of the structure may require that the optics remain fixed in position. Hence, in cases where it is impractical or undesirable to translate the Faraday optic element, what is needed is a means of tuning the strength of axial magnetic fields in the vicinity of a fixed Faraday optic to achieve precisely 45° of Faraday rotation.

Referring to FIG. 1, a truncated Halbach array of the prior art that is used to generate high magnetic fields for Faraday rotation is shown in a cross-sectional diagram. A hollow housing tube 2 and dual endplate screws 3 threaded into each end of the tube 2 together enclose permanent magnet radial sectors 4 and 5 and a center axial magnet 6 of toroidal construction, which are all centered around axis 1 and a Faraday optic element 7. The magnetization arrows shown indicate that all radial sectors 4 have a North pole at their inner surfaces, whereas all radial sectors 5 have a South pole at their inner surfaces. Center axial magnet 6 is disposed to exhibit magnetization along axis 1 such that it opposes the inner surfaces (like poles) and attracts the outer surfaces (opposite poles) of radial sectors 4 and 5. In a typical Faraday Rotator, there are four or more radial sectors 4 and 5 on either side of center axial magnet 6. Ideally in a conventional Halbach array, radial sector magnets 4 and 5 could be a single immovable ring with magnetization everywhere directed radially with respect to axis 1. Such single ring radial magnets would have the highest efficiency. However, such magnets are not readily attainable using high strength permanent magnets and would also require an expensive magnetizing fixture requiring extremely high discharge currents to generate radial magnetizing fields. For these practical reasons, an ideal single ring radial magnet is approximated with a ring comprised of two or more radial sectors—with more sectors held rigidly in place and forming a better approximation of an ideal radial magnet ring. The outer and/or inner surface of these axially symmetric magnetic structures can be circular as shown, or square or rectangular as appropriate. Housing tube 2 may be of ferrous or non-ferrous material. Endplate screws 3 will typically be a non-ferrous material so as to not provide a leakage path for magnetic flux generated by the radial sectors 4 and 5.

Arranged and magnetized in this fashion, the radial sectors 4 and 5 and the center axial magnet 6 together form a truncated Halbach array which can generate high magnetic fields directed along axis 1 in the region of Faraday optic 7, enabling instantiation of a Faraday rotator of compact dimensions. Such Faraday rotators have found widespread use with high power lasers in the wavelength range of 1030 nm to 1080 nm when a rod of approximately 2 cm in length of terbium gallium garnet "TGG" is used as the Faraday optic 7.

FIG. 2 shows a plot of the magnetic field strength along axis 1 of FIG. 1 when four radial sectors 4 and 5 form separate rings of dimension 34.5 mm OD×6.1 mm ID×13.0 mm thick and Center Axial magnet 6 has dimensions 34.5 mm OD×6.1 mm ID×12.0 mm thick. At 20° C. the residual induction of radial sectors 4 and 5 used is 13.0 kG and the intrinsic coercivity is 17 kOe. The residual induction of center axial magnet 6 as used is 11.2 kG and the intrinsic coercivity is 30 kOe at 20° C. With a 2 cm TGG Faraday optic 7 centered in the magnet structure, the average magnetic field H along axis 1 over the length of the TGG Faraday optic at 23° C. is $H_{avg}(23°C.)=11.55$ kOe.

Nd—Fe—B magnets, such as those used in the above models, have a reversible temperature coefficient of $-0.11\%/°$C. Hence the average magnetic field along axis 1 over the length of the 2 cm TGG is 11.84 kOe, 11.59 kOe, 11.34 kOe, and 11.08 kOe at 0°, 20°, 40° and 60° C., respectively.

In practice, variations in the strength of individual permanent magnets comprising a magnetic structure and/or variations in the Faraday rotation element can also change the expected Faraday rotation angle $\theta(\lambda,T)$ by as much as 5 to 10%. This is a further practical impetus for seeking means to tune the magnetic field $H(T)$.

SUMMARY

According to the invention, a permanent magnet structure with tunable longitudinal magnetic fields is provided for use in applications such as Faraday rotators and optical isolators. Based on a Halbach array, the tunable magnetic structure has at least one end of an enclosing housing tube that is tapered away from the axis of the magnet structure. In a specific embodiment, an adjustable endplate screw is operative to push against sets of radial magnet sectors at each end of a magnet structure having a central axis. Because the inner surfaces of the radial magnet sectors have the same pole as a central axial magnet a strong repulsive force exists between the inner surfaces of the radial magnet sectors and the central axial magnet. Similarly, the outside surfaces of the radial magnet sectors have the opposite pole as the central axial magnet, resulting in a strong attraction of the outside surfaces of the radial magnet sectors to the central axial magnet. Consequently, turning the Endplate Screw to translate the face contacting the end surface of the radial magnet sectors at the inner surface edge away from the center of the magnet structure allows the radial magnet sectors to pivot at a point on the outer surface edge of the radial magnet sectors closest to the center of the magnet structure and flare or "flower" into voids in tapered regions of the enclosure. Because the strength of the magnetic fields is a rapid function of the cross sectional dimension of the gap formed by the inner surfaces, rapid tuning of axial magnetic field strength is achieved in a compact design. When used with Faraday rotators "flowering" the radial magnet sectors in this way does not substantially change the radial uniformity of the $H(T)\cdot L$ product across the aperture of the Faraday optic—an important practical requirement for high isolation in optical isolators and circulators.

When applied to Faraday-effect devices rotator, such as an optical isolator, an optical circulator or Faraday mirror, a further advantage of the present invention is that it enables one compact device to be used for a range of wavelengths and/or temperatures without requiring movement of critically aligned optical elements. The permanent magnet structure of this invention applies to all-fiber or bulk optic forms of Faraday-effect devices that receive laser radiation of any wavelength by any combination of fiber and/or free space coupling.

When sets of radial magnet sectors are on each end of the axial magnet, the tunable magnet structure of the present invention generates high longitudinal fields with high efficiency. It is not essential to have radial magnets on both ends of the axial magnet however. It is possible to use only one set of radial magnet sectors adjacent to the axial magnet to achieve lower strength longitudinal fields that are tunable in accordance with the present invention.

DETAILED DESCRIPTION OF THE INVENTION

Figure 1:
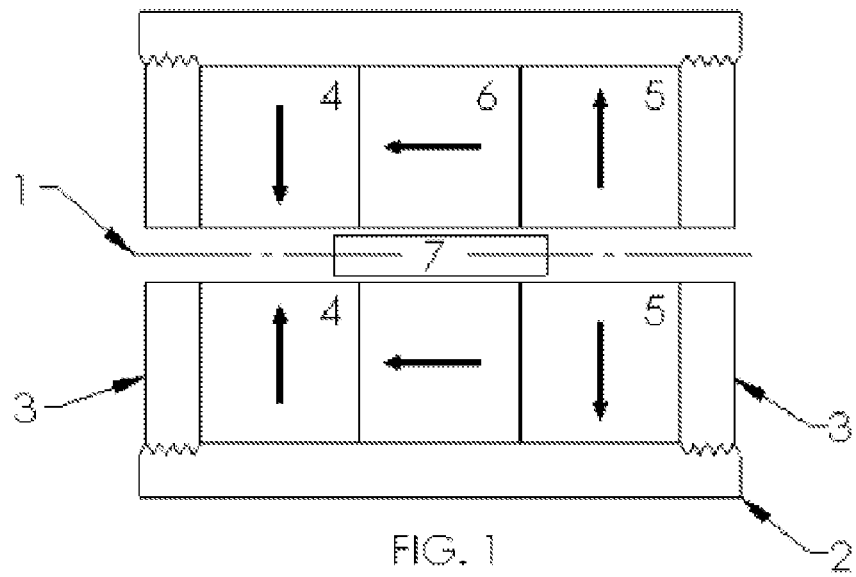
FIG. 1 is a cross-sectional view of a truncated Halbach array of the prior art used as a Faraday rotator.
Figure 3:
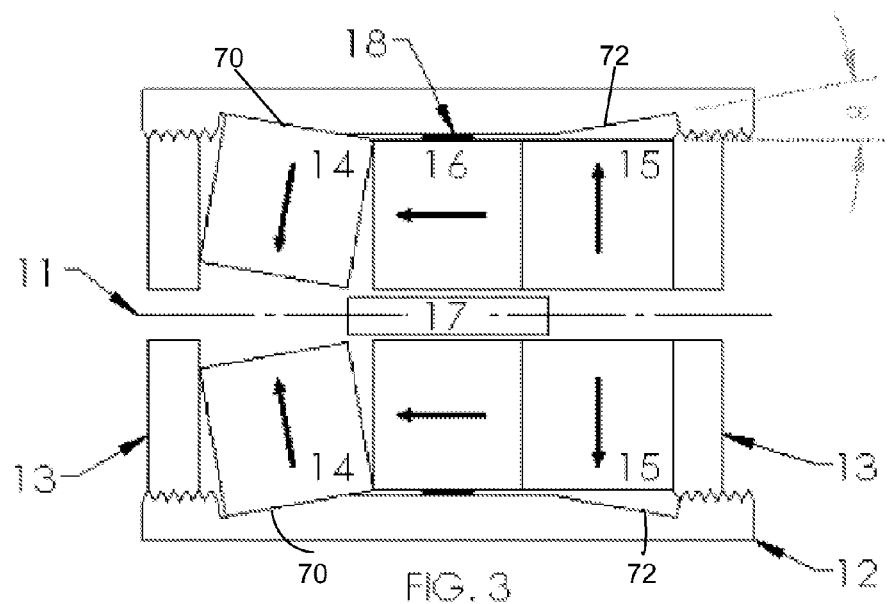
FIG. 3 is a cross-sectional view showing a tunable magnetic structure of the present invention used as a Faraday rotator.

FIG. 3 is a cross-sectional view showing a tunable magnetic structure of the present invention as a Faraday rotator using bulk optical elements similar to the Halbach array. Notably according to the invention it has multiple-element movable radial sectors 14 and 15, where member of the set of radial sectors 14 or 15 is not bound to other members of the set. Otherwise it is structurally similar to the prior art of FIG. 1 with the notable exception according to the invention that the inner diameter of the housing 12 contains voids or outward tapers 70, 72 established at an angle $\alpha$ at each end up to the endplate screw 13 that permit flaring of the multiple radial sectors. The taper typically begin at the outside edge of the radial magnet sectors closest to the center of the magnet structure. More particularly these tapers 70, 72 allow the multiple radial sectors 14 and 15 to "flower" or flare within the housing 12 typically constrained and controlled by the face of the adjacent endplate screw 13 when the screw is displaced outwardly along axis 1, as shown on the left side at taper 70. The sectors are compressed when the adjacent endplate screw 13 is displaced inwardly along axis 1 as shown on the right side as compressed out of the taper 72. The position of center axial magnet 16 relative to the housing 12 is fixed to the housing 12 with adhesive 18 or equivalent. Faraday optic 17 is shown centered relative to center axial magnet 16. When the endplate screw 13 adjacent to radial sectors 15 is not displaced outwardly, the abutted radial sectors 15 cannot tilt into the tapered region 72 of housing 12. In practice, both endplate screws 13 can be adjusted anywhere from no outward displacement to full outward displacement and thus the adjacent corresponding full tilt of the radial sectors 14 and/or 15 can be rotated into the tapered regions 70, 72 adjacent the ends of housing 12. This physical movement results in a change in magnetic field along the axis 1, resulting in field strength change or, as used herein, tuning according to the invention. The taper angle $\alpha$ can be increased to broaden the tuning range of the resulting magnetic field strength as long as the wall thickness of housing 12 is appropriately thick to minimize undesired radial deformation. The housing 12 may be made of a ferrous or non-ferrous material of sufficient strength to contain the magnet structure.

Figure 2:
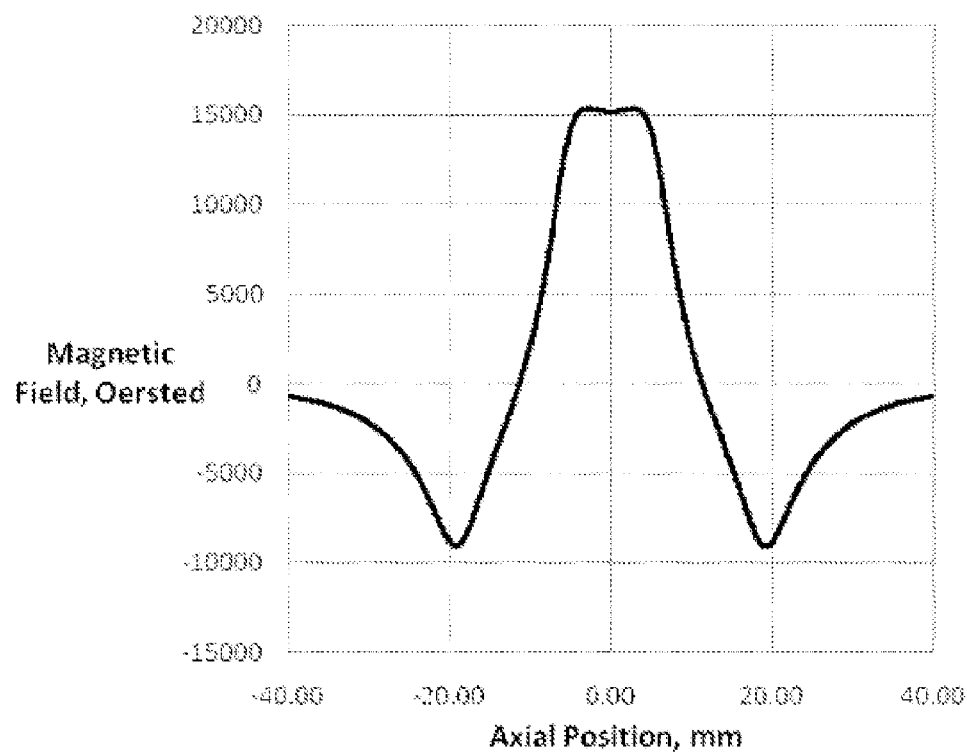
FIG. 2 is a plot of magnetic field strength along the axis of the prior art magnet structure of FIG. 1.
Figure 4:
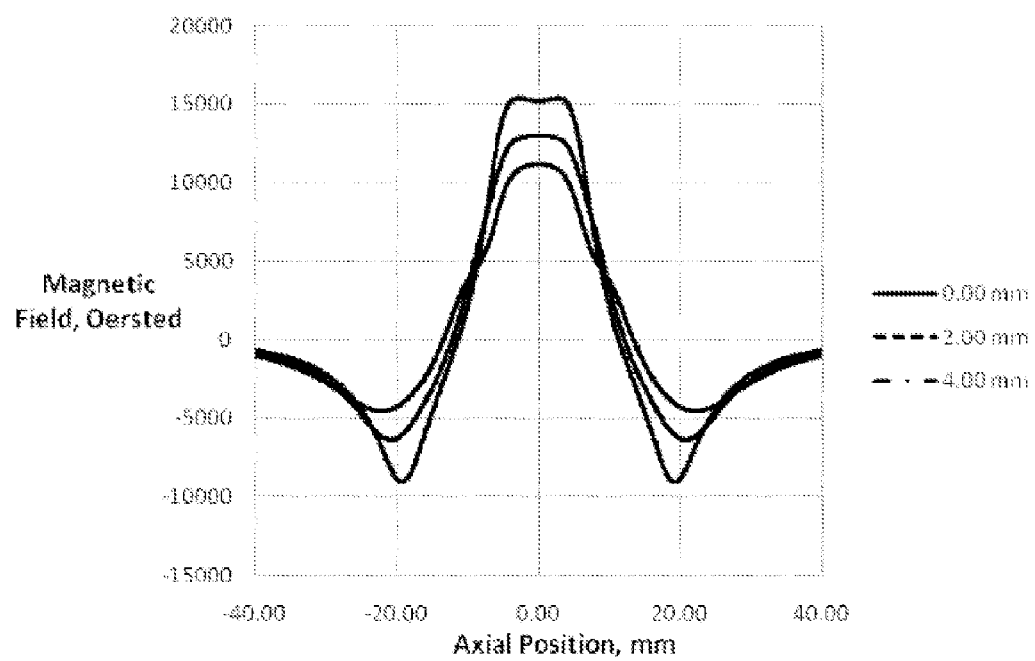
FIG. 4 is a graph showing the adjustable range of magnetic field strength along the axis of the tunable magnetic structure of the present invention.

FIG. 4 is a plot showing the adjustable range of the magnetic field strength along the axis of the tunable magnetic structure of the present invention as shown in FIG. 3. The magnet dimensions and properties are the same as those used in the plot of FIG. 2. Four sectors each are used to form Radial Sectors 14 and 15. With no displacement of the Endplate Screws 13, the axial magnetic field plot as shown in the top curve is the same as the prior art Halbach array of FIG. 2. The average magnetic field over the 2 cm length of Faraday Optic 17 at 23° C. is $H_{ave}(0 \text{ mm})=11.55$ kOe. With both Endplate Screws 13 equally displaced 2 mm, the tilt angle $\alpha=8.0°$ and $H_{ave}(2 \text{ mm})=10.17$ kOe. The axial magnetic field plot with Endplate Screws 13 displaced 2 mm is shown as the middle curve of FIG. 4. Finally an axial magnetic field plot with both Endplate Screws 13 displaced 4 mm is shown as the bottom curve in FIG. 4. Here the tilt angle $\alpha=17.45°$ and $H_{ave}(4 \text{ mm})=8.34$ kOe. Hence the 28% maximum reduction in average magnetic field over the length of Faraday Optic 17 for the parameters used, represents the tuning range of the present invention in this example.

Figure 5:
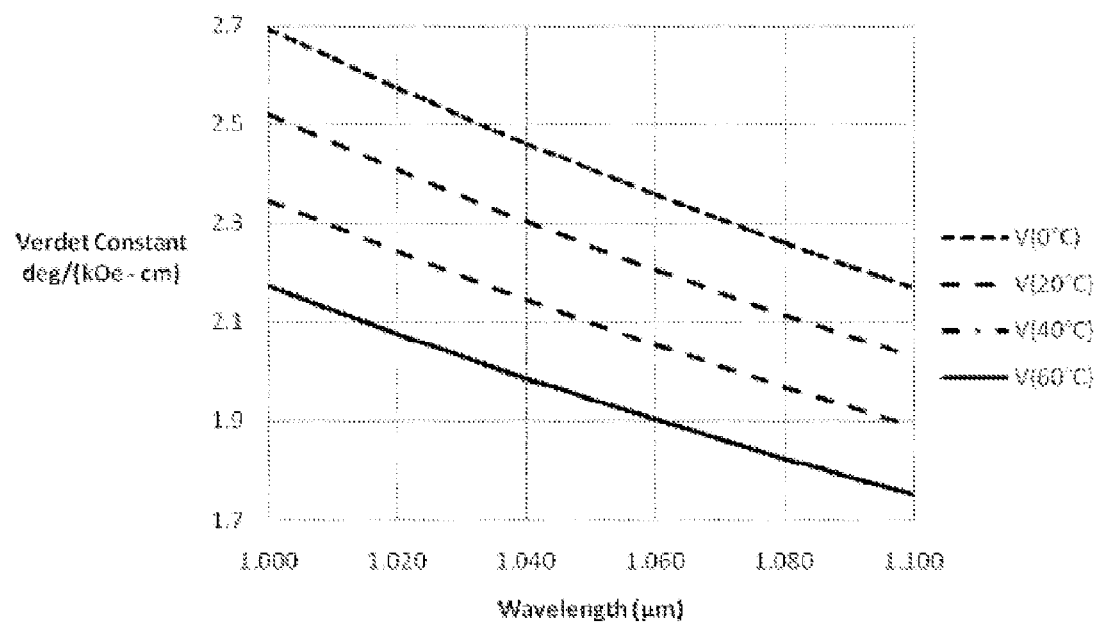
FIG. 5 is a graph of TGG Verdet constant versus wavelength at temperatures of 0°, 20°, 40° and 60° C.

FIG. 5 plots the TGG Verdet constant as a function of wavelength at 0, 20, 40 and 60° C. in units of deg/(kOersted-cm).

Figure 6:
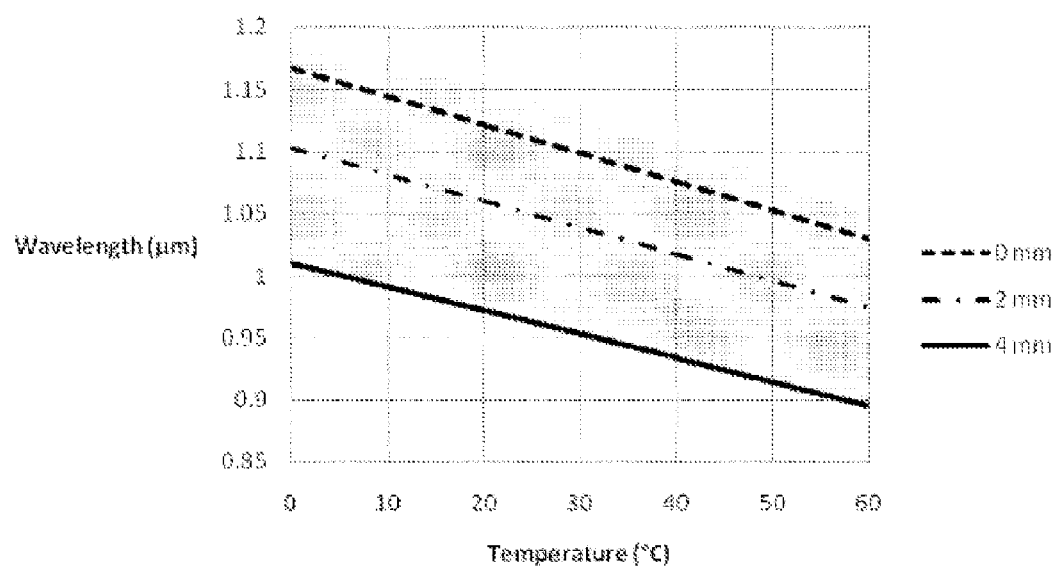
FIG. 6 is a graph showing the relationship between wavelength and temperature for the prior art magnet structure together with the range of achievable wavelengths and temperatures using the magnet structure of the present invention when the Faraday rotation is held constant at 45°.

Using the TGG Verdet constants given in FIG. 5 together with the magnetic field strengths for the prior art (FIG. 2) and the magnetic structures of the present invention (e.g., FIG. 4), equation 1 may be used to plot the relationship between wavelength and temperature for the prior art magnet structure together with the range of achievable wavelengths and temperatures using the magnet structure of the present invention when the Faraday rotation is held constant at 45° as shown in FIG. 6. Optical isolators, circulators and Faraday mirrors typically require the precise sum of 45° of Faraday rotation along the length of Faraday Optic used for optimal performance. Here the top curve ($H_{ave}(0 \text{ mm})=11.55$ kOe) for zero Endplate Screw 13 displacement, represents the fixed relationship between wavelength and temperature when the Faraday rotation is at the optimum 45° rotation angle. The middle curve ($H_{ave}(2 \text{ mm})=10.17$ kOe) shows the relationship between wavelength and temperature for 45° Faraday rotation when both Endplate Screws 13 are displaced 2 mm in accordance with the present invention. The bottom curve ($H_{ave}(4 \text{ mm})=8.34$ kOe) shows the relationship between wavelength and temperature for 45° Faraday rotation when the endplate screws 13 are displaced 4 mm and the radial magnet sectors are fully "flowered" on both ends of the magnet structure of the present invention. The shaded region represents the full range of arbitrary wavelength and/or temperature operating conditions that can be adjusted for optimal 45° Faraday rotation when using the magnet structure of the present invention.

Figure 7A:
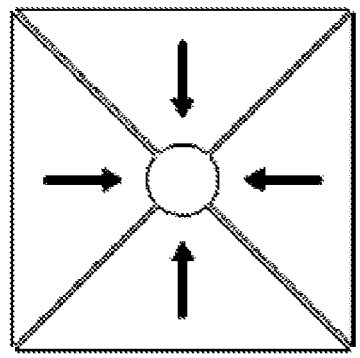
FIGS. 7A-7C are transverse cross-sectional views of different radial magnets showing various alternative outer and inner shapes in accordance with the invention.
Figure 7B:
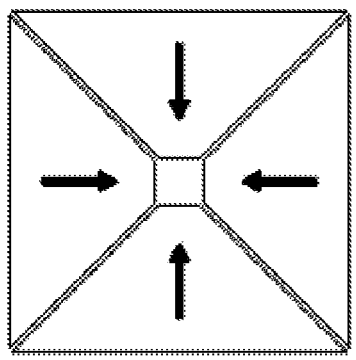
Figure 7C:
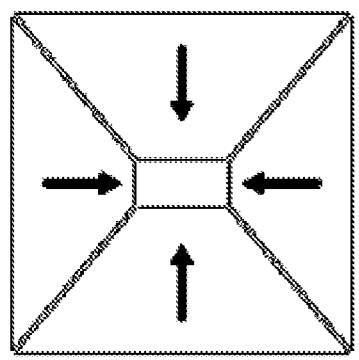

The present invention is useful with magnets having outer and/or inner surfaces different from those described above. In general planes of axial symmetry are preferred so as to balance repulsion between like magnetic poles for structural stability as well as uniformity of longitudinal magnetic fields within the central region of the structure. FIGS. 7a-7c show examples of such possibilities where one set of radial magnets is shown in cross sectional view. In FIG. 7a, the outer surface cross section is square, whereas the inner surface is circular in cross section. In FIG. 7b, both the outer and inner surfaces are square in cross section. Square cross sections can be preferable for certain compact packaging requirements. Rectangular inner surface cross sections can be beneficial when designing isolators for linear arrays of beams, for all-fiber Faraday effect devices, for elliptically shaped beams and for PI isolators. FIG. 7c shows a set of radial magnets in accordance with the present invention capable of generating uniform longitudinal fields within a rectangular inner cross section. Here the outer surfaces are square in cross section, whereas the inner surface is rectangular. These examples show just some of the many permutations that are possible with the present invention.

Figure 8:
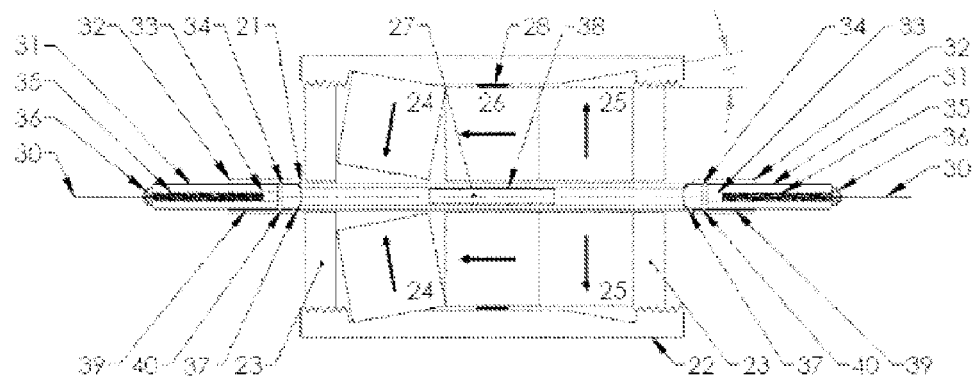
FIG. 8 is a cross-sectional view of an embodiment of the present invention configured as a fiber-to-fiber optical isolator.

FIG. 8 is a cross-sectional view showing the invention configured as a fiber-to-fiber optical isolator for use at power levels well beyond 2 W. The tunable magnet structure is analogous in form and function to the structure previously described in FIG. 3, with multiple-element radial sectors 24 and 25 that are movable within a threaded housing 22 in response to pressure exerted by endplate screws 23. A Faraday optic 27 is mounted in an optics tube 21 and retained with adhesive 38. Polarizing fiber pigtailed collimators are formed from polarizing fiber 30, fused silica ferrule 31, coreless endcap fiber 33, fused silica sleeve 32, collimating lens 34, fused mode stripping powder 35 and strain relief adhesive 36 as disclosed in U.S. Pat. No. 7,306,376. At each end a fused silica ferrule 31 is bonded to fused a silica sleeve 32 with optically transmissive adhesive 39. Similarly, transmissive adhesive 40 is used to bond collimating lens 34 to fused silica sleeve 32. Upon bonding of collimating lenses 34 to optics tube 21 with adhesive 37, optics tube 21 becomes the structural support element which maintains the critical alignment of the polarizing fiber pigtailed collimators. Optics tube 21 may then be mechanically decoupled from vibrations and differential expansion of the tunable magnet structure. Mode stripping powder 35 and ferrule 31 are chosen to be sufficiently long so as to reduce rejected polarization cladding power due to a level which is safe for the optical fiber coating in accordance with U.S. Pat. No. 7,306,376. Used in this fashion, the tunable magnet structure comprising elements 23, 24 and 25 allows a fiber-to-fiber optical isolator to be tuned for operation at a specific wavelength or temperature.

Figure 9:
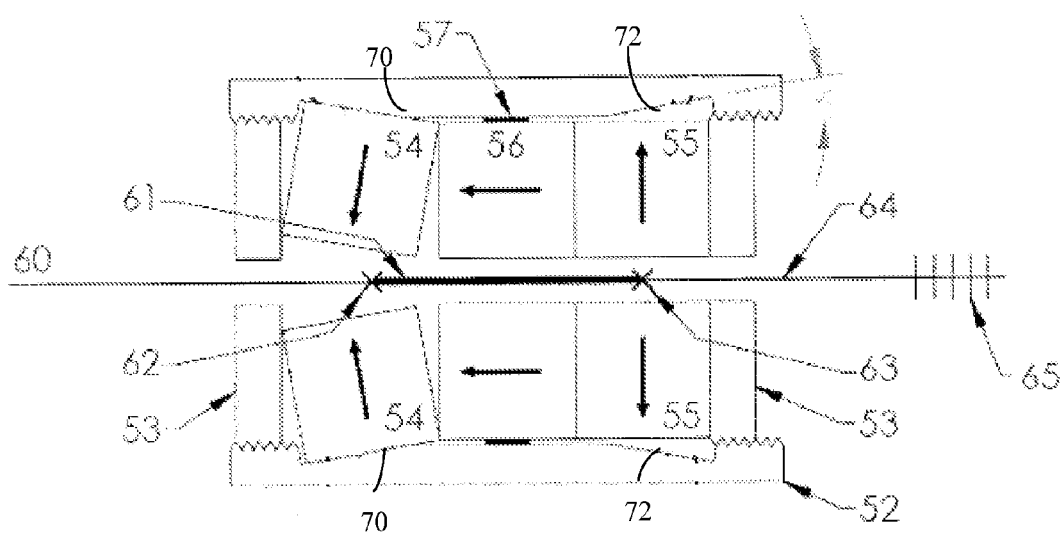
FIG. 9 is a cross-sectional view of an embodiment of the present invention configured as all-fiber Faraday mirror.

All-fiber versions of Faraday effect devices are becoming available. In all-fiber devices every optical element required is in the form of optical fiber which are then fusion spliced together to form a completely sealed and aligned beam path. Since all-fiber Faraday effect devices also require an externally applied magnetic field with the same requirements as for bulk optic devices, the invention is equally suitable for use with all-fiber Faraday effect devices such as optical isolators and Faraday mirrors as well as linear or bundled arrays of the same. FIG. 9 illustrates in cross section an all-fiber Faraday mirror using the present invention. The tunable magnet structure comprised of elements 52-57 shown in FIG. 9 again is similar in every respect to that described previously in connection with FIG. 3. Single mode fiber 60 carries radiation into and out of the Faraday mirror, which is the depiction of FIG. 9. SMF 60 is spliced to Faraday fiber 61 with a fusion splice 62. Faraday fiber 61 has a guiding core of higher refractive index than an outer cladding. Such a Faraday fiber 61 is capable of 45° Faraday rotation within the tunable magnet structure of the present invention. The other end of Faraday fiber 61 is coupled with a fusion splice 63 to another SMF 64. A fiber Bragg grating 65 is written into SMF 64 to reflect radiation back through the Faraday mirror to source SMF 60. Faraday mirrors ensure that whatever polarization state is input into the Faraday mirror will be given a $\pi/2$ phase shift. This 90° polarization rotation can effectively cancel undesirable polarization effects and is commonly used between two passes of a fiber amplifier. Since typical fiber diameters are very small ($\approx 300$ μm) relative to typical magnet structure inner diameters ($\geq 2.5$ mm), multiple all-fiber Faraday mirrors or optical isolators can readily be used in an array or bundle with the present invention. To this end a fiber bundle of Faraday fibers may be disposed in place of a single fiber 61 and Faraday fiber 64.

The invention has been explained with reference to specific embodiments. Other embodiments will be evident to those of ordinary skill in the art. It is therefore not intended that the invention be limited, except as indicated by the appended claims.

What is claimed is:

1. A permanent magnet structure comprising:
   an axially symmetric housing surrounding an axial clear aperture along a central axis;
   a longitudinally magnetized axial high-strength permanent magnet surrounding the axial clear aperture within the housing;
   at least one set of at least two radial magnet sectors disposed adjacent said axial magnet, the magnet sectors having radially aligned magnetization wherein inner surface magnetic poles are aligned to be the same as the pole of the adjacent surface of said axial magnet;
   said housing having an outwardly tapered inner section in the region of the at least one set of radial permanent magnet sectors for allowing radial tilting of the magnet sectors; and
   an endplate displaceably attached in the end of the housing and disposed abutting the at least one set of radial magnet sectors, the endplate being translatable along the central axis to effect radial tilting of the abutted adjacent radial magnet sector set into the tapered section of said housing thereby tuning the strength of longitudinally directed fields in the region in and near the axial magnet inner surface.

2. The tunable magnet structure of claim 1 further comprising:
   a Faraday optical element forming a tunable Faraday rotator disposed along the central axis within the axial magnet, the Faraday optical element being responsive to the longitudinally directed fields to induce Faraday rotation of the polarization state of optical energy transmitted through the Faraday optical element.

3. The tunable magnet structure of claim 2 wherein the Faraday optical element is coupled to a fiber optic structure.

4. The tunable magnet structure of claim 2 wherein the Faraday optical element is a fiber optic structure coupled to a fiber optic structure.

5. The tunable magnet structure of claim 4 the Faraday optical element being fusion spliced to adjacent all-fiber optical elements.

6. The tunable magnet structure of claim 2 wherein the Faraday optical element is a bundle of fiber optic structures coupled to a bundle of fiber optic structures.

7. A Faraday device comprising:
   an axially symmetric housing surrounding an axial clear aperture along a central axis;
   a longitudinally magnetized axial high-strength permanent magnet surrounding the axial clear aperture within the housing;
   a nonlinear optical element disposed in the clear aperture along the central axis within the axial magnet;
   at least one set of at least two radial magnet sectors disposed adjacent said axial magnet, the magnet sectors having radially aligned magnetization wherein inner surface magnetic poles are aligned to be the same as the pole of the adjacent surface of said axial magnet;
   said housing having an outwardly tapered inner section in the region of the at least one set of radial permanent magnet sectors for allowing radial tilting of the magnet sectors; and
   an endplate displaceably attached in the end of the housing and disposed abutting the at least one set of radial magnet sectors, the endplate being translatable along the central axis to effect radial tilting of the abutted adjacent radial magnet sector set into the tapered section of said housing thereby tuning the strength of longitudinally directed fields in the region in and near the axial magnet inner surface.

8. The Faraday device according to claim 7 configured to be a polarization maintaining optical isolator.

9. The Faraday device according to claim 7 configured to be a polarization insensitive optical isolator.

10. The Faraday device according to claim 7 configured to be a Faraday mirror.

* * * * *